United States Patent
Durant et al.

(10) Patent No.: US 10,983,025 B2
(45) Date of Patent: Apr. 20, 2021

(54) SYSTEM AND METHOD OF MONITORING A DIAGNOSTIC SYSTEM OF A PROCESS CONTROL SYSTEM

(71) Applicant: EMERSON PROCESS MANAGEMENT REGULATOR TECHNOLOGIES, INC., McKinney, TX (US)

(72) Inventors: Tony A. Durant, McKinney, TX (US); Nathan A. Quinn, McKinney, TX (US); John D. Cockerham, Tulsa, OK (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 328 days.

(21) Appl. No.: 16/027,058

(22) Filed: Jul. 3, 2018

(65) Prior Publication Data
US 2020/0011755 A1    Jan. 9, 2020

(51) Int. Cl.
*G01L 19/00*  (2006.01)
*G01P 13/00*  (2006.01)
*G01L 19/08*  (2006.01)

(52) U.S. Cl.
CPC ........ *G01L 19/0092* (2013.01); *G01L 19/083* (2013.01); *G01P 13/00* (2013.01)

(58) Field of Classification Search
CPC ............ B65D 2590/0083; B65D 90/10; B65D 90/105; B65D 90/34; B65D 90/48; F16K 17/194; F16K 24/06; F16K 35/00; F16K 37/0041; F16K 37/005; G01L 19/0092; G01L 19/083; G01P 13/00
See application file for complete search history.

(56) References Cited

U.S. PATENT DOCUMENTS

| | | | |
|---|---|---|---|
| 10,174,519 B1 * | 1/2019 | Carpenter | ............. G08B 21/18 |
| 2002/0190068 A1 | 12/2002 | Sisk et al. | |
| 2015/0167857 A1 * | 6/2015 | Myers | ................... F16K 17/194 137/266 |
| 2016/0288944 A1 | 10/2016 | Matz | |
| 2018/0141518 A1 | 5/2018 | Iverson et al. | |

FOREIGN PATENT DOCUMENTS

| CN | 202368999 U | 8/2012 |
|---|---|---|
| CN | 204044951 U | 12/2014 |

OTHER PUBLICATIONS

International Search Report and Written Opinion, corresponding International Application No. PCT/US2019/039137, dated Nov. 11, 2019.
Provisional Opinion Accompanying the Partial Search Results for International Application No. PCT/US2019/039137, dated Sep. 17, 2019.

\* cited by examiner

*Primary Examiner* — Mischita L Henson
(74) *Attorney, Agent, or Firm* — Marshall, Gerstein & Borun LLP

(57) ABSTRACT

Monitoring systems and methods for a relief valve system. In one example, a monitoring system for a relief valve includes at least one tilt sensor coupled to one or more of a cover or a latch of the relief valve. The at least one tilt sensor is associated with an interface. Upon detection by the at least one tilt sensor that one of the cover is open or the latch is unlocked, a signal is transmitted by the interface indicating one or more of the cover is open or the latch is unlocked.

44 Claims, 11 Drawing Sheets

SYSTEM AND METHOD OF MONITORING A DIAGNOSTIC SYSTEM OF A PROCESS CONTROL SYSTEM

FIELD OF THE DISCLOSURE

The disclosure generally relates to process control systems and, more specifically, to a system and method of monitoring a diagnostic system of the process control system.

BACKGROUND OF THE DISCLOSURE

Process control systems often employ control valves to control the flow of process fluids. Relief systems, such as relief valves, are typically used for various control valves and include emergency pressure relief vents and pressure vacuum relief valves. In some examples, the conventional relief systems are coupled to a tank and monitored by observing an overall pressure of the tank. In other examples, physical, visual indicators are attached to one or more parts of the valve and require physical inspection to determine a state of the relief system, for example.

An increasing number of laws have been enacted on limiting an amount of volatile organic compounds (VOCs) being emitted from process control systems. The VOCs include organic compounds that easily become vapors or gases and contain elements that may cause various health effects including eye, nose and throat irritation, headaches, nausea, and links to cancer. As a result, for at least this reason, it is imperative for companies to constantly monitor relief valve systems to avoid or minimize fines and an excess amount of harmful VOCs being emitted into the environment.

SUMMARY OF THE DISCLOSURE

In accordance with a first exemplary aspect of the present disclosure, a monitoring system for a relief valve, the relief valve having a body and a cover coupled to the body by a latch, comprises at least one tilt sensor adapted to be coupled to one or more of the cover or the latch of the relief valve. The monitoring system further includes an interface associated with the at least one tilt sensor. Upon detection by the at least one tilt sensor that an angle of one or more of the cover or the latch is greater than zero, the interface transmits a signal indicating one or more of the cover is open or the latch is unlocked.

In accordance with a second exemplary aspect of the present disclosure, a monitoring system for a relief valve comprises a first wireless accelerometer adapted to be coupled to a first portion of a control assembly near a first relief opening and is for detecting a valve disk is in the open position. The relief valve includes a body having the first relief opening and a second relief opening, a cover coupled to the body, a control assembly disposed within the body and having a valve disk moveable between an open position and a closed position. The monitoring system further comprises a second wireless accelerometer adapted to be coupled to a second portion of the control assembly near the second relief opening and is for detecting the valve disk is in the open position. A first interface is associated with the first wireless accelerometer, and a second interface is associated with the second wireless accelerometer. Upon detection by the first wireless accelerometer of acceleration of the first portion of the control assembly in a direction toward an open position, the first interface transmits a signal indicating the valve disk is in the open position. In addition, upon detection by the second wireless accelerometer of acceleration of the second portion of the control assembly in a direction toward the open position, the second interface transmits a signal indicating the valve disk is in the open position.

According to a further exemplary aspect of the present disclosure, a monitoring system for a relief vent, the relief vent comprising a base adapted to be coupled to a tank and a cover rotatably coupled to the base by a hinge mechanism, comprises one of a tilt sensor coupled to the cover or a rotary motion sensor coupled to the hinge mechanism. One of the tilt sensor or the rotary motion sensor is for detecting an angle of the cover relative to an axis. An interface is associated with the tilt sensor or the rotary motion sensor. Upon detection by one of the tilt sensor or the rotary motion sensor the angle of the cover is greater than zero, the interface transmits an alarm signal indicating the cover is open.

According to another exemplary aspect of the present disclosure, a monitoring system for a pressure vacuum relief valve comprises one of a first travel sensor or a first wireless accelerometer adapted to be coupled to a pressure pallet and is for measuring a distance traveled by the pressure pallet. The pressure vacuum relief valve includes a body defining a pressure chamber and a vacuum chamber, the pressure chamber having a valve seat and a pressure pallet adapted to sealingly engage the valve seat, and the vacuum chamber having a valve seat and a vacuum pallet adapted to sealingly engage the valve seat of the vacuum chamber. The monitoring system for the pressure vacuum relief valve further comprises one of a second travel sensor or a second wireless accelerometer adapted to be coupled to the vacuum pallet and for measuring a distance traveled by the vacuum pallet. A first interface is associated with one of the first travel sensor or the first wireless accelerometer. In addition, a second interface is associated with one of the first travel sensor or the second wireless accelerometer. Upon detection by one of the first and second the travel sensors or the first and second wireless accelerometers that the distance traveled by the pressure pallet or the vacuum pallet remains constant in a direction associated with an open position of one or more of the pressure pallet or the vacuum pallet, one or more of the first interface or the second interface transmits a signal indicating one or more of the pressure pallet or the vacuum pallet is failing to close. In addition, upon detection by one of the first travel sensor or the first wireless accelerometer that the distance traveled by the pressure pallet is zero and a pressure in a tank of the body of the valve is greater than a setpoint pressure, the first interface transmits a signal indicating the pressure pallet is failing to open. Also, upon detection by one of the second travel sensor or the second wireless accelerometer, that the distance traveled by the pressure pallet is zero and the pressure in the tank is less than a setpoint pressure, the second interface transmits a signal indicating the vacuum pallet is failing to open.

In accordance with yet another aspect, a method of monitoring a diagnostic system of a process control system comprises coupling a tilt sensor to one or more of a latch, an arm, or a cover of a diagnostic system, and monitoring a position of one or more of the latch, the arm or the cover relative to an axis via the tilt sensor. The method further comprises detecting, via the tilt sensor, one or more of the latch, the cover, or the arm is disposed at an angle from an axis that is greater than zero, and transmitting, via an interface, a signal indicating the cover is open.

In accordance with yet another aspect, a method of monitoring a relief valve of a process control system comprises coupling a first wireless accelerometer to a first portion of a control assembly near a first relief opening of the relief valve and a second wireless accelerometer to a second portion of the control assembly near to a second relief opening of the relief valve. The method further comprises detecting, via the first wireless accelerometer, acceleration of a first portion of the control assembly, and detecting, via the second wireless accelerometer, acceleration of the second portion of the control assembly. Upon detecting acceleration of the first portion of the control assembly in a direction toward an open position, the method comprises transmitting, via an interface associated with the first wireless accelerometer, a signal indicating a valve disk of the control assembly is in an open position. In addition, upon detecting acceleration of the second portion of the control assembly in a direction toward the open position, the method also comprises transmitting, via an interface associated with the second wireless accelerometer, a signal indicating the valve disk of the control assembly is in the open position.

In accordance with yet another aspect, a method of monitoring a relief vent of a process control system comprises coupling one of a tilt sensor to a cover of a relief vent or a rotary motion sensor to a hinge mechanism of the relief vent, the hinge mechanism coupling the cover to a base of the relief vent, and the base having an axis. The method further comprises measuring a position of the cover via one of the tilt sensor or the rotary motion sensor, and detecting, via one of the tilt sensor or the rotary motion sensor, when the cover is disposed at an angle from the axis of the base that is greater than zero. The method also comprises transmitting, via an interface, a signal indicating the cover is open upon detecting the cover is disposed at an angle from the axis of the base that is greater than zero.

In accordance with still yet another aspect, a method of monitoring a relief valve comprises coupling one of a travel sensor or a wireless accelerometer to a pressure pallet and a vacuum pallet of the relief valve and measuring a distance traveled by one or more of a pressure pallet or a vacuum pallet via one of the travel sensor or the wireless accelerometer disposed on the pressure pallet or the vacuum pallet. The method further comprises detecting, via one or more of the travel sensor or the wireless accelerometer, one or more of the pressure pallet or the vacuum pallet is failing to close when the distance traveled by the pressure pallet or the vacuum pallet remains constant in a direction associated with an open position of the relief valve. The method further comprises detecting, via one or more of the travel sensor or the wireless accelerometer, the pressure pallet is failing to open when the distance traveled by the pressure pallet is zero and a pressure of a tank of the relief valve is greater than a setpoint pressure. The method still further comprises detecting, via one or more of the travel sensor or the wireless accelerometer, the vacuum pallet is failing to open when the distance traveled by the vacuum pallet is zero and the pressure of the tank is less than the setpoint pressure. The method also comprises transmitting a signal, via one or more interfaces associated with one of the travel sensor or the wireless accelerometer, when detecting one or more of the vacuum pallet or the pressure pallet is one or more of open or failing to open.

In further accordance with any one or more of the foregoing exemplary aspects, the monitoring system may comprise a base station including a base processor and a base memory, and the base station may be communicatively coupled to one of the tilt sensor or the wireless accelerometer via a wireless network and adapted to receive the signal transmitted by the interface.

In some preferred forms, the monitoring system may further comprise a temperature sensor for measuring the temperature of the tank and a pressure sensor coupled for measuring the pressure of the tank, each of the temperature sensor and the pressure sensor having an interface for transmitting a signal indicating one of the measured temperature or the measured pressure. Further, each of the measured temperature, the measured pressure, and the detected distance traveled by one or more of the pressure pallet and the vacuum pallet, or the angle of the cover of the relief valve may be used to estimate an instantaneous fluid flow value F out of the pressure vacuum relief valve during an overpressure event.

In some other preferred forms, the method may include detecting, via one or more of the first and second wireless accelerometers, one or more of an opening speed or a closing speed of the valve disk of the control assembly. In addition, the method may further include detecting, via one or more of the first and second wireless accelerometers, oscillatory movement of one or more of the first portion of the control assembly or the second portion of the control assembly, the oscillatory movement indicating the valve disk is in the open position.

Additional optional aspects and features are disclosed, which may be arranged in any functionally appropriate manner, either alone or in any functionally viable combination, consistent with the teachings of the disclosure. Other aspects and advantages will become apparent upon consideration of the following detailed description.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several FIGS., in which:

DETAILED DESCRIPTION

Generally, the present disclosure is directed to methods and systems of monitoring relief valves by sensing movement, orientation and/or acceleration (instead of pressure or flow) of one or more parts of the relief valve. In particular, the monitoring systems use one or more of a rotary motion sensor, a tilt sensor, a travel sensor, a wireless accelerometer, and/or a gyroscope to determine a state of the relief valve. In this manner, the state of the relief valve, including whether it is operating correctly, in an open or a closed position, or experiencing different behaviors, such as oscillation, can be determined. As a result, the detection of pressure and flow of fluid of a tank associated with the relief valve in conventional relief valve monitoring systems and methods is not required.

In one example, the various motion sensors are communicatively coupled to a remote base station, which receives signals from one or more of the sensors indicating a current state or condition of the relief valve. So configured, diagnostic information about the relief valve is transmitted through a wireless network and to the base station, allowing the relief valve and/or process control system to be remotely monitored without having to physically examine fluid leaving a tank associated with the relief valve, for example. Various configurations and examples of this present disclosure are described more below.

Figure 1:
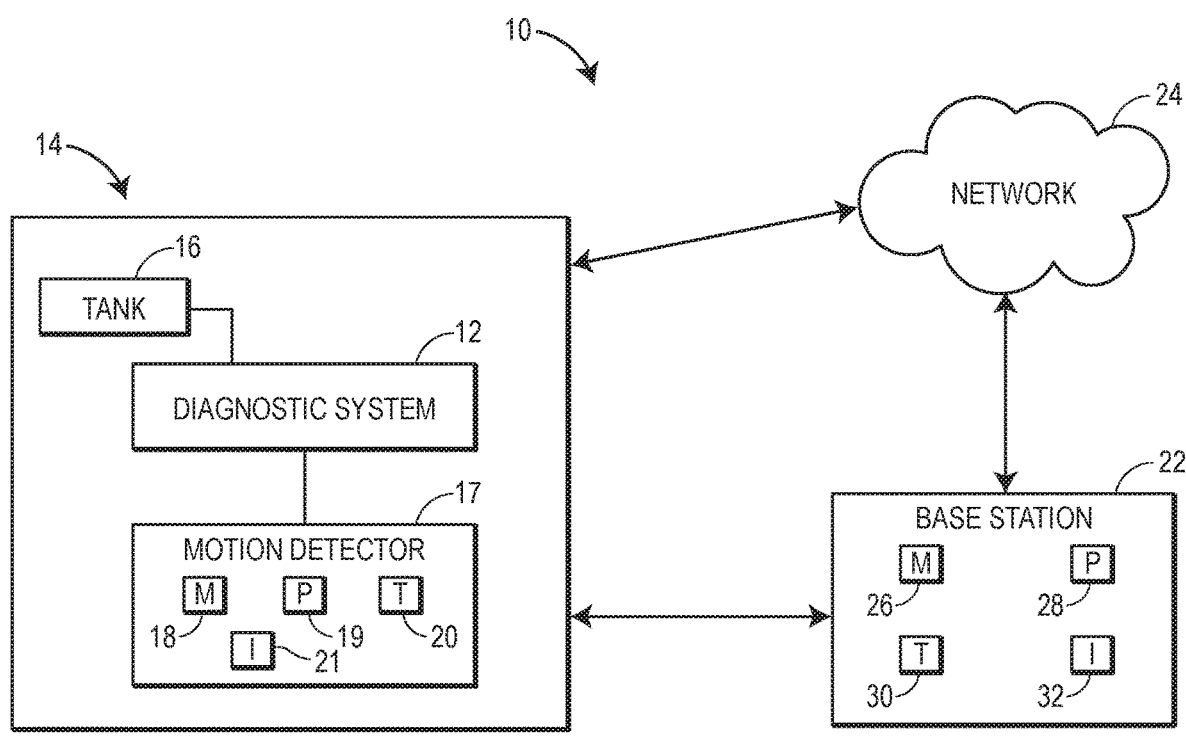
FIG. 1 is a block diagram of a monitoring system for a relief system of a process control system according to the present disclosure.

Referring now to FIG. 1, a monitoring system 10 for a diagnostic system 12 of a process control system 14 according to aspects of the present disclosure is depicted. The process control system 14 includes at least one tank 16 and the diagnostic system 12 may be coupled to the tank 16. The diagnostic system 12 may include one of an emergency pressure relief vent, a pressure vacuum relief valve, and/or a lockdown hatch, as explained more below. The monitoring system 10 includes at least one motion detector 17 coupled to the diagnostic system 12. As explained more below, the motion detectors 17 may include one or more of a rotary motion sensor, a tilt sensor, an wireless accelerometer, a travel sensor, or a gyroscope, each of which may include a memory 18, a processor 19 coupled to the memory 18, a transmitter 19 and an interface 20.

In another example, the monitoring system 10 includes a base station 22 located remotely from the process control system 14 and monitoring system 10. The base station 22 is communicatively coupled to the monitoring system 10 via a wireless network 24, as depicted in FIG. 1. The base station 22 includes a base memory 26, a base processor 28, a base transmitter 30, and a base interface 32, all of which interact with the motion detectors 17 and associated interface 21, as explained more below. So configured, at least one or more motion detectors 17 detect movement of one or more parts of the diagnostic system 12 and the signal is transmitted, such as by the interface 21 associated with the motion detector 18 to the base station 22, indicating a state of the relief system. In some examples, the signal transmitted is an alarm signal indicating the diagnostic system includes a relief valve which is one of failing to open or failing to close, for example, allowing a remote operator to understand the state of the diagnostic system 12 without having to physically evaluate the diagnostic system 12.

Figure 2:
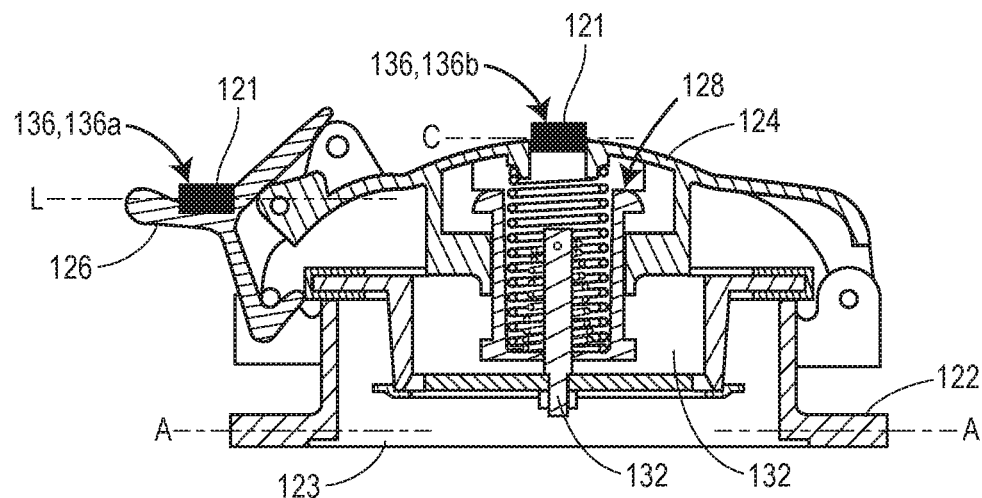
FIG. 2 is a sectional view of a monitoring system for a relief valve according to an exemplary aspect of the present disclosure.
Figure 3:
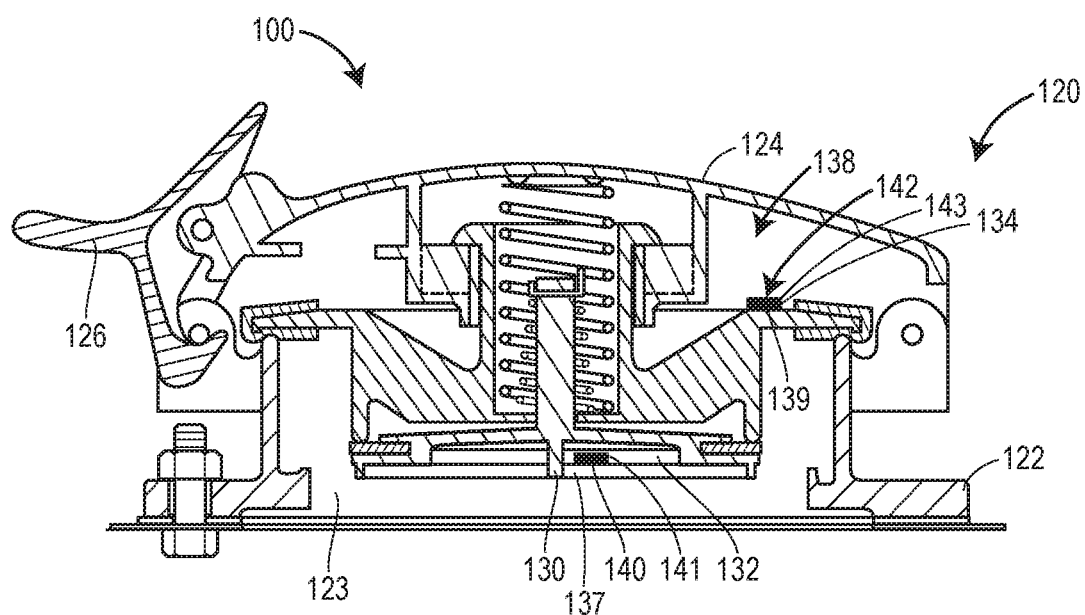
FIG. 3 is a sectional view a monitoring system for a relief valve according to another exemplary aspect of the present disclosure.

In one example, and referring now to FIGS. 2 and 3, an exemplary monitoring system 100 for a diagnostic system 12 of the present disclosure is depicted. In this example, the exemplary diagnostic system 12 is a relief valve 120, such as Enardo Models ES-660 and ES-660-L Thief Hatches. The relief valve 120 is adapted to be coupled to a tank, such as the tank 16 (FIG. 1) of the process control system 14, and includes a body 122 with a flow passageway 123 and a cover 124 rotatably attached to the body 122 by a latch 126. As depicted in FIG. 2, the body 122 includes an axis A, the cover 124 includes an axis C, and the latch 126 includes an axis L. In one example, when each of the cover 124 and the latch 126 are in an initial position, such as a closed position (FIG. 2), the axis C of the cover is parallel to the axis A of the body, such that the cover is not disposed from an angle of the axis A of the body 122. Likewise, the axis L of the latch 126 is also not disposed from an angle of the axis A of the body 122 in this initial position.

Further, a control assembly 128 is disposed in the body 122 and enclosed by the cover 124. The control assembly 128 includes a valve disk 130 adapted to move between an open position in which fluid flows through the flow passageway 123 and a closed position in which fluid is prevented from flowing through the flow passageway 123. The relief valve 120 also includes a first relief opening 132 disposed adjacent to the valve disk 130 and a second relief opening 134.

As depicted in FIG. 2, at least one tilt sensor 136 is disposed on a portion of the latch 126 and another tilt sensor 136 is disposed on the cover 126. Each tilt sensor 136 is associated with an interface 21 (FIG. 1), such as the interface 121 depicted. So configured, upon detection by the at least one tilt sensor 136 that one or more of the latch 126 or the cover 124 is disposed at an angle from the axis A of the body 122 that is greater than zero, an alarm signal is transmitted indicating the cover 124 of the relief valve 120 is one of open or not securely closed. In one example, the interface 121 of the tilt sensor 136 transmits the alarm signal to the base station 22 (FIG. 1), informing the operator of the state of the relief valve 120.

In one example, the at least one tilt sensor 136 includes a first tilt sensor 136a adapted to be coupled to the latch 126 and a second tilt sensor 136b adapted to be coupled to the cover 124. In this example, the first tilt sensor 136a detects when an angle of the latch 126 is greater than zero relative to an axis, such as the axis A of the body 122, and, therefore, that the latch 126 is unlocked. In addition, the second tilt sensor 136b detects when an angle of the cover 124 is greater than zero relative to an axis, such as the axis A of the body 122, and, therefore, that the cover 124 is open.

In another example, the at least one tilt sensor 136 includes the first tilt sensor 136a adapted to be coupled to an arm, such as the arm 226 in FIG. 4, as explained more below, and the second tilt sensor 136b coupled to a cover, such as the cover 224, also of FIG. 4, as explained more below. In this example, the first tilt sensor 136a detects when an angle of the arm 226 is greater than zero relative to an axis, and, therefore, that the cover 224 is open. In a similar manner, the second tilt sensor 136b detects when an angle of the cover 224 is greater than zero relative to an axis, and, therefore, that the cover 224 is open.

Alternatively, and as depicted in FIG. 3, instead of or in addition to using the tilt sensors 136 on the latch 126 and cover 124 of the relief valve 120, as in FIG. 2, a pair of wireless accelerometers 138 may be coupled to other portions of the relief valve 120. Specifically, and in this example, a first wireless accelerometer 140 of the pair of wireless accelerometers 138 is coupled to a first portion 137 of the control assembly 128 immediately adjacent to the first relief opening 132. In addition, a second wireless accelerometer 142 of the pair of wireless accelerometers 138 is coupled to a second portion 139 of the relief valve 120 immediately adjacent to the second relief opening 134, as depicted in FIG. 3. The first wireless accelerometer 140 detects motion, such as acceleration, of the first portion 137 of the control assembly 124 in a first direction, such as a direction associated with an open position, e.g., a direction away from the base 122. An interface 141 associated with the first wireless accelerometer 140 then transmits a signal indicating the valve disk 130 is in the open position. In a similar manner, the second wireless accelerometer 142 detects motion, such as acceleration, of the second portion 139 of the control assembly 128 in the first direction, such as the direction associated with the open position. An interface 143 associated with the second wireless accelerometer 142 transmits a signal indicating the valve disk 130 is in the open position. More generally, the operation of the pressure relief and/or the vacuum relief functions are sensed, as further explained below.

The first interface 141 associated with the first wireless accelerometer 140 may transmit a signal, such as an alarm signal to the base station 22 (FIG. 1), upon detection that the valve disk 130 is in the open position. Likewise, the second interface 142 associated with the second wireless accelerometer 142 may transmit a signal, such as an alarm signal to the base station 22, upon detection that the valve disk 130 is in an open position. In addition, each of the first and second wireless accelerometers 140, 142 also may detect oscillatory motion of one or both of the first portion 137 and the second portion 139 of the control assembly 128. The detection of oscillatory motion further indicates the valve disk 130 is in the open position. Moreover, the first wireless accelerometer 140 may detect upward movement of the first portion 137 of the control assembly 128 without downward movement, indicating the valve disk 130 is in the open position. Likewise, the second wireless accelerometer 142 may detect upward movement of the second portion 139 of the control assembly 128 without downward movement, indicating the valve disk 130 is in the open position.

Figure 4:
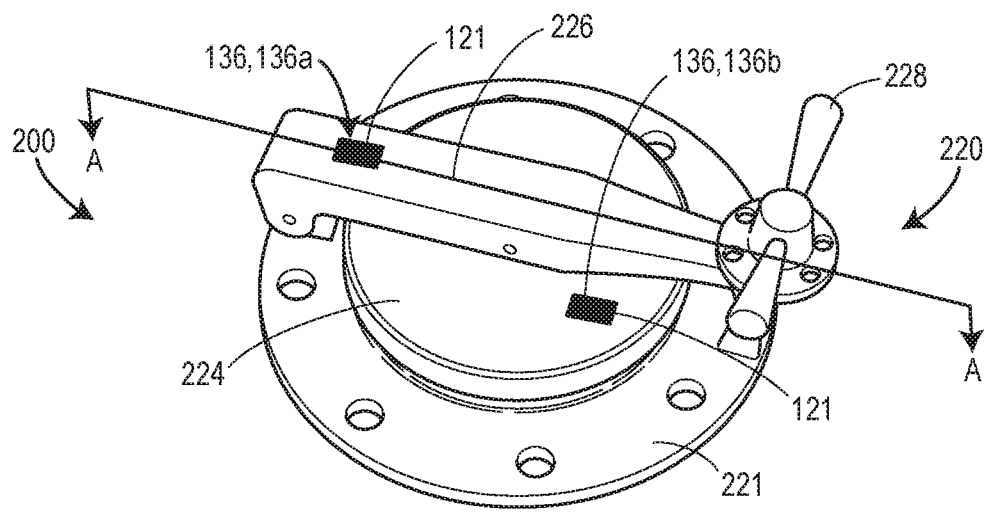
FIG. 4 is a perspective view of a monitoring system for a lockdown hatch according to another aspect of the present disclosure.
Figure 5:
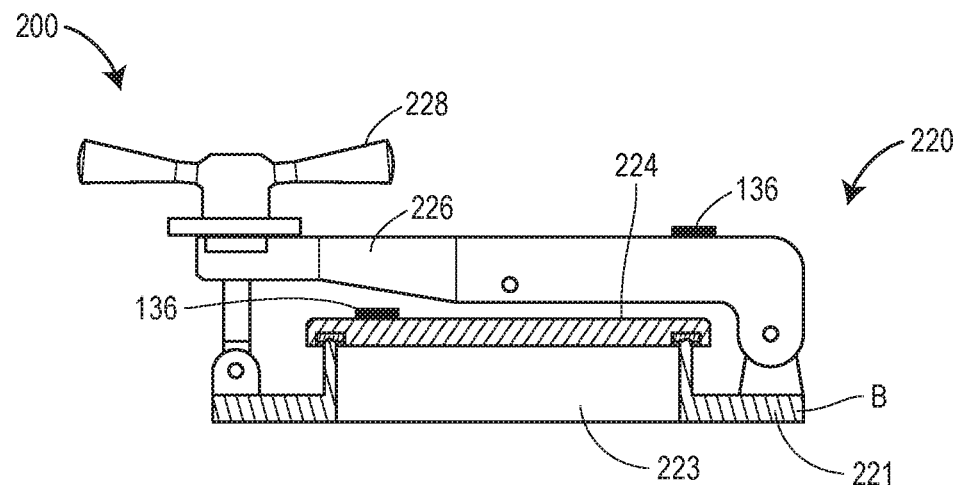
FIG. 5 is rear sectional view taken along the lines A-A of FIG. 4 of the monitoring system for the lockdown hatch of FIG. 4.

Referring now to FIGS. 4 and 5, another exemplary monitoring system 200 for a diagnostic system 12 of the present disclosure is depicted. In this example, the exemplary diagnostic system 12 is a lockdown hatch 220, such as Enardo Model 1000. Lock Down Hatch. The lockdown hatch 220 is adapted to be coupled to a tank, such as the tank 16 (FIG. 1) of the process control system 14, and includes a body 221 with a flow passageway 223 (FIG. 5) and a cover 224 attached to an arm 226 having a handle 228. Upon movement of the arm 226 and the handle 228 in a direction away from the cover 224, for example, the cover 224 is lifted upward with the arm 226 and the flow passageway 223 is open, providing relief. Like the relief valve 120 of FIG. 2, at least one tilt sensor 136 is coupled to the arm 226 or the cover 222, and the interface 121 is associated with each tilt sensor 136.

So configured, upon detection by the at least one tilt sensor 136 that one or more of the arm 226 or the cover 222 is disposed at an angle from an axis B of the body 221 (FIG. 5) that is greater than zero, an alarm signal is transmitted indicating one or more of the arm 226 or the cover 222 of the lockdown hatch 220 is one of open or not securely closed. In one example, the interface 20 of the tilt sensor 136 transmits the alarm signal to the base station 22 (FIG. 1), informing the operator of the state of the lockdown hatch 220.

Figure 6:
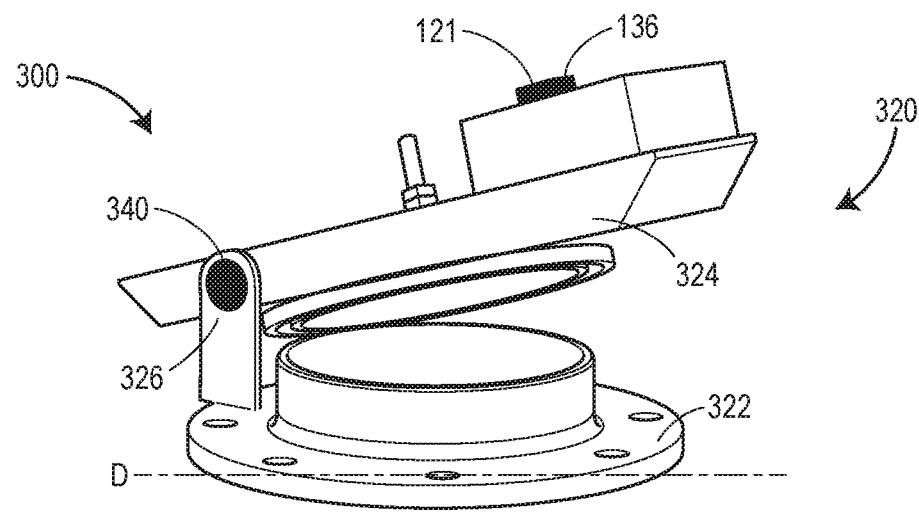
FIG. 6 is a perspective view of a monitoring system for a relief vent according to yet another aspect of the present disclosure.
Figure 7:
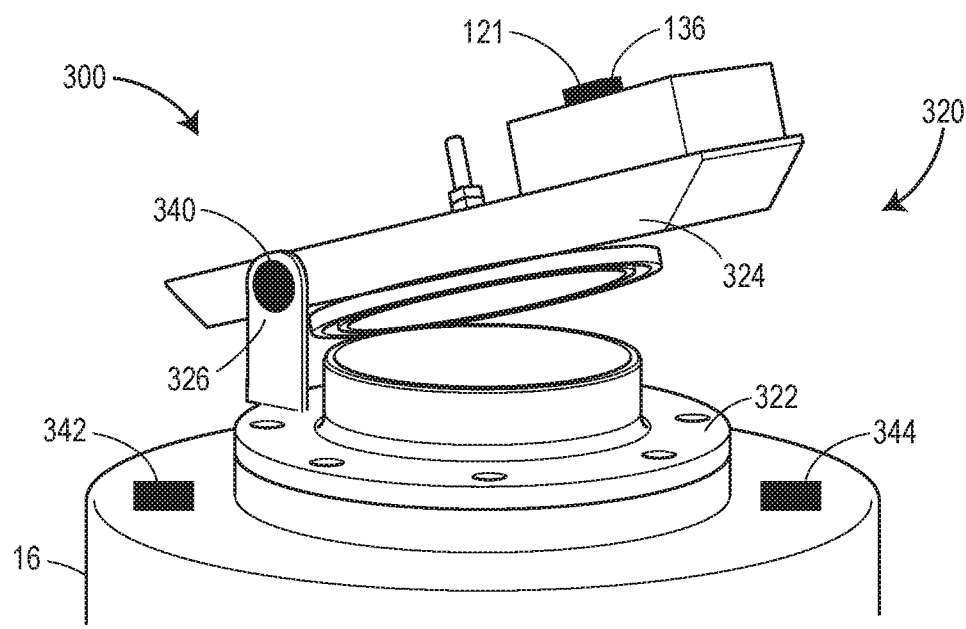
FIG. 7 is a perspective view of a monitoring system for a relief vent of FIG. 6 according to another aspect of the present disclosure.

Referring now to FIGS. 6 and 7, another exemplary monitoring system 300 of the diagnostic system 12 of the present disclosure is depicted. In this example, the exemplary diagnostic system 12 is a relief vent 320, such as an Enardo Pressure Relief Vent, model 2000. The relief vent 320 may also be adapted to be coupled to the tank 16 (FIG. 1) of the process control system 14 and includes a base 322 and a cover 324 rotatably mounted to the base 322 by a hinge mechanism 326. In this example, one of a tilt sensor 136 is coupled to the cover 324 or a rotary motion sensor 340 is coupled to the hinge mechanism 326. Each of the tilt sensor 136 and the rotary motion sensor 340 detects a change in an angle of the cover 324 relative to an axis, such as an axis D of the base 322. Each of the tilt sensor 136 and the rotary motion sensor 340 is associated with the interface 121.

So configured, upon detection the cover 324 is disposed at an angle from the axis D of the base 322 of the relief vent 320 that is greater than zero, the interface 121 transmits a signal indicating the cover 324 is open, as depicted in FIGS. 6 and 7. In addition, upon detection that the cover 324 is not disposed at an angle from the axis D of the base 322 that is greater than zero, the interface 121 transmits a signal indicating the cover 324 is closed. In one example, the signal transmitted by the interface 20 is an alarm signal, and the interface 121 transmits the alarm signal to the remotely located base station 22 (FIG. 1) coupled to the process control system 14 via the network 24, for example, informing the operator of the state of the relief vent 320.

In another example, and as depicted in FIG. 7, a tank temperature sensor 342 may be coupled to a portion of the tank 16 (FIG. 1), such as a body of the tank 16, to which the relief vent 320 is adapted to be attached. In addition, a pressure sensor 344 may be coupled to another portion of the tank 16, again such as the body of the tank 16, to which the relief vent 320 is adapted to be attached. The temperature sensor 342 may continuously measure the temperature of the tank 16, and the pressure sensor 344 may continuously measure the pressure of the tank 16. So configured, each of the measured temperature of the tank, the measured pressure of the tank 16, and the cover angle data measured by one of the tilt sensor 136 or the rotary motion sensor 340 may be used to estimate a fluid flow total during an overpressure event, for example and as explained more below.

More specifically, the fluid flow value F is calculated, by one or more processors, in accordance with the following formula:

$$Q = \sqrt{\frac{K_1}{G*T_t}} * K_2 * \theta * P_t * \sin K_3 \sqrt{\frac{P_t - P_{atm}}{P_t}}$$

where
$P_T$=Absolute pressure of gas in tank
$T_T$=Absolute temperature of gas in tank
G=specific gravity of gas in tank
$P_{atm}$=Atmospheric pressure Θ=cover angle or cover position
K₁=Absolute temperature constant
K₂=cover angle constant
K₃=Trim shape constant In addition, and in one example, the monitoring system 300 may further include one or more of a wireless accelerometer or a gyroscope coupled to a portion of the cover 324 and for sensing one or more of the motion and position of the cover 324.

Figure 8:
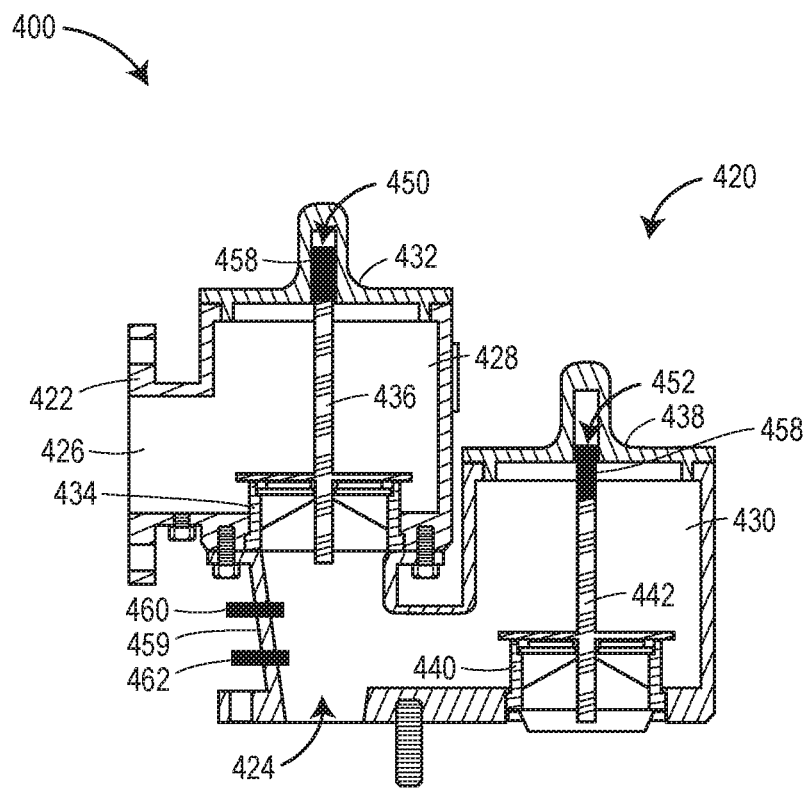
FIG. 8 is a sectional view of a monitoring system for a pressure vacuum relief valve according to another aspect of the present disclosure.
Figure 9:
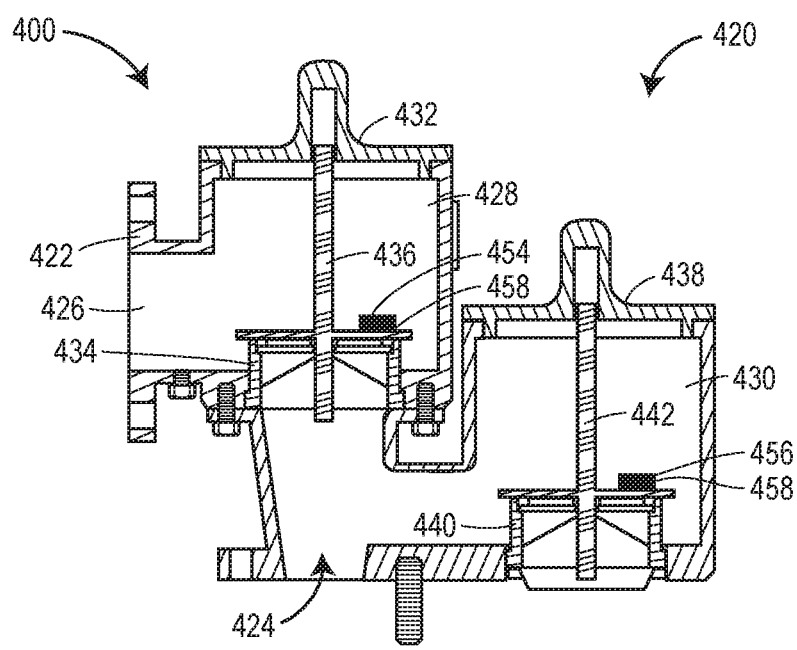
FIG. 9 is another sectional view of a monitoring system for the pressure vacuum relief valve of FIG. 8.

Referring now to FIGS. 8 and 9, another exemplary monitoring system 400 for the diagnostic system 12 of the present disclosure is depicted. In this example, the exemplary diagnostic system 12 is a pressure vacuum relief valve (PVRV), such as an Enardo Pressure Vacuum Relief Valve, Model 850. The pressure vacuum relief valve 420 includes a body 422 defining an inlet 424, an outlet 426, a pressure chamber 428, and a vacuum chamber 430. The pressure chamber 428 is enclosed by a lid 432 and includes a valve seat 434 and a pressure pallet 436, which together form a seal and prevent any vapors to pass through the outlet 426 during normal operation. Likewise, the vacuum chamber 430 is enclosed by a lid 438 and includes a valve seat 440 and a vacuum pallet 442, which together form a seal, preventing vapors from passing through the outlet 426, for example. So configured, the pressure vacuum relief valve 420 maintains a tight seal until system pressure or vacuum exceed the set pressure of the pressure vacuum relief valve 420, for example. When overpressure occurs, the pressure pallet 436 lifts, breaking the seal between one or more of the valve seat 434 and corresponding pallet 436. When underpressure occurs, i.e., increased vacuum, the vacuum pallet 442 lifts. Upon relief, the pressure vacuum relief valve 420 reseals and remains sealed.

The monitoring system 400 of the pressure vacuum relief valve 420 and includes a first travel sensor 450 attached to the pressure pallet 436 and a second travel sensor 452 attached to the vacuum pallet 442. Alternatively, and as depicted in FIG. 9, a first wireless accelerometer 454 may be attached to the pressure pallet 436 and a second wireless accelerometer 456 may be attached to the vacuum pallet 442 (instead of using the first and second travel sensors 450, 452 of FIG. 8). In either example, both the first travel sensor 450 and the first wireless accelerometer 454 measure a distance traveled by the pressure pallet 436 relative to a period of time, for example. Both the first travel sensor 450 and the first wireless accelerometer 454 also detect movement of the pressure pallet 436 in a direction associated with an open position of the relief valve 420, such as a direction away from the valve seat 434 when a distance traveled by the pressure pallet 436 is greater than zero, for example. In addition, both the first travel sensor 450 and the first wireless accelerometer 454 detect the pressure pallet 436 is failing to open, e.g., stuck in a closed position, when the distance traveled of the pressure pallet 436 remains at zero during an overpressure event, as described more below.

In a similar manner, both the second travel sensor 452 and the second wireless accelerometer 456 measure a distance traveled by the vacuum pallet 442 relative to a period of time, for example, and detect movement of the vacuum pallet 442 in a direction associated with an open position of the relief valve, e.g., moved away from the valve seat 440 when a distance traveled by the vacuum pallet 442 is greater than zero. In addition, both the second travel sensor 452 and the second wireless accelerometer 456 detect the vacuum pallet 442 is failing to open, e.g., stuck in a closed position, when the distance traveled by the vacuum pallet 442 remains at zero during a vacuum event.

Further, each of the first and second travel sensors 450, 452 and the first and second wireless accelerometers 454, 456 is associated with an interface 458 that implements a signal, such as an alarm signal, when it is detected one or more of the pressure pallet 436 or the valve pallet 442 is open, failing to open, or failing to close, as explained more below.

In another example, and as depicted in FIG. 8, a pressure sensor 460 is attached to a tank portion 459 of the body 422 of the pressure vacuum relief valve 420. In addition, a temperature sensor 462 is also attached to the tank portion 459 of the body 422 of the pressure vacuum relief valve 420. The pressure sensor 460 measures pressure in the tank portion 458 and the temperature sensor 462 measures pressure in the tank portion 458 relative to a period of time, for example. Each of the pressure sensor 460 and the temperature sensor 462 is associated with an interface that transmits a signal indicating one of the measured temperature or the measured pressure to the base station 22, for example. So configured, a fluid flow value F out of the tank 458 may be estimated by one or more processors, such as the processor 28 of the base station 22, for example, (FIG. 1) based on the measured temperature, the measured pressure of the tank, and the distance traveled by the pressure pallet 436 during an overpressure event, as also explained more below. More specifically, and in one example, the fluid flow value F is calculated in accordance with the following formula:

$$Q = \sqrt{\frac{K_1}{G*T_t}} * K_2 * y * P_t * \sin K_3 \sqrt{\frac{P_t - P_{atm}}{P_t}}$$

Figure 10A:
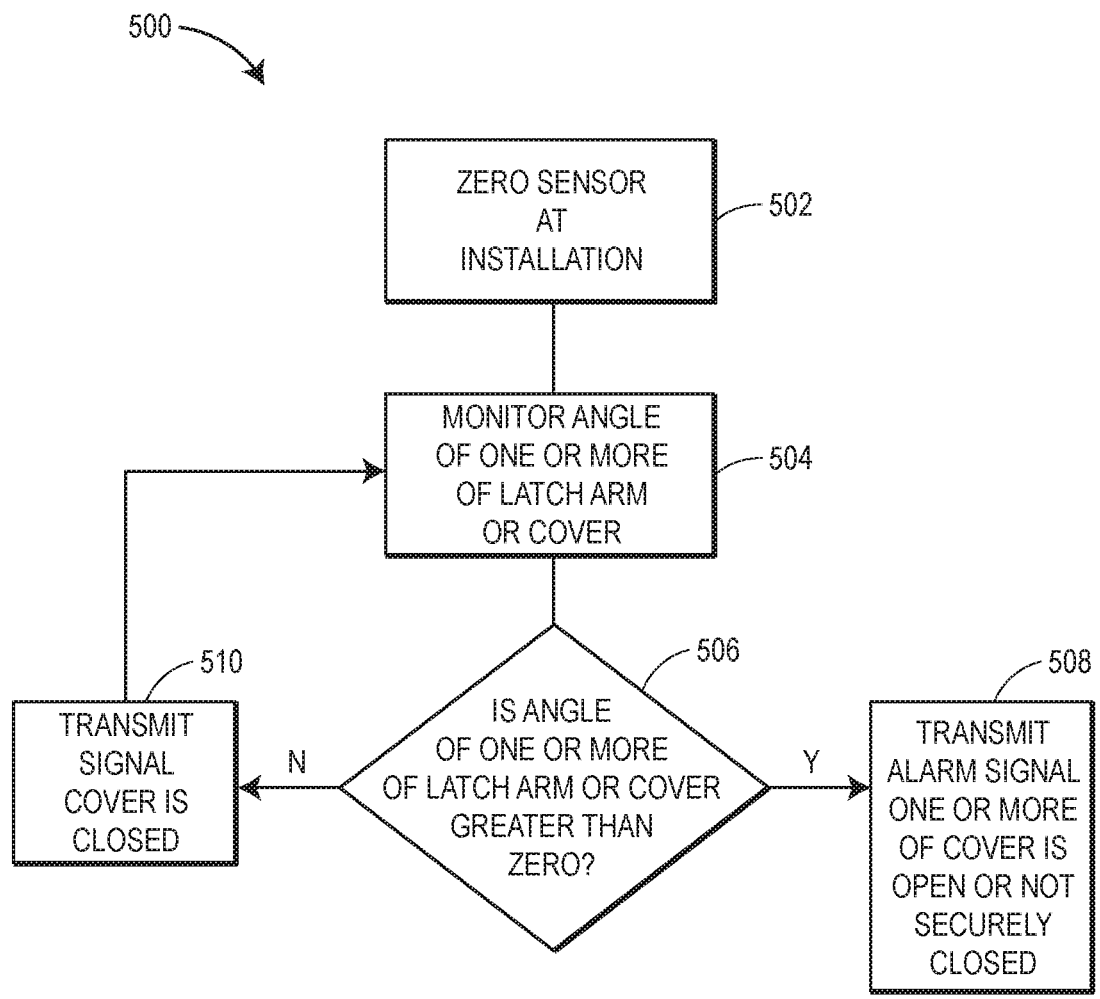
FIG. 10A is an exemplary flow chart depicting a method of one or more of the monitoring systems of the present disclosure.
Figure 10B:
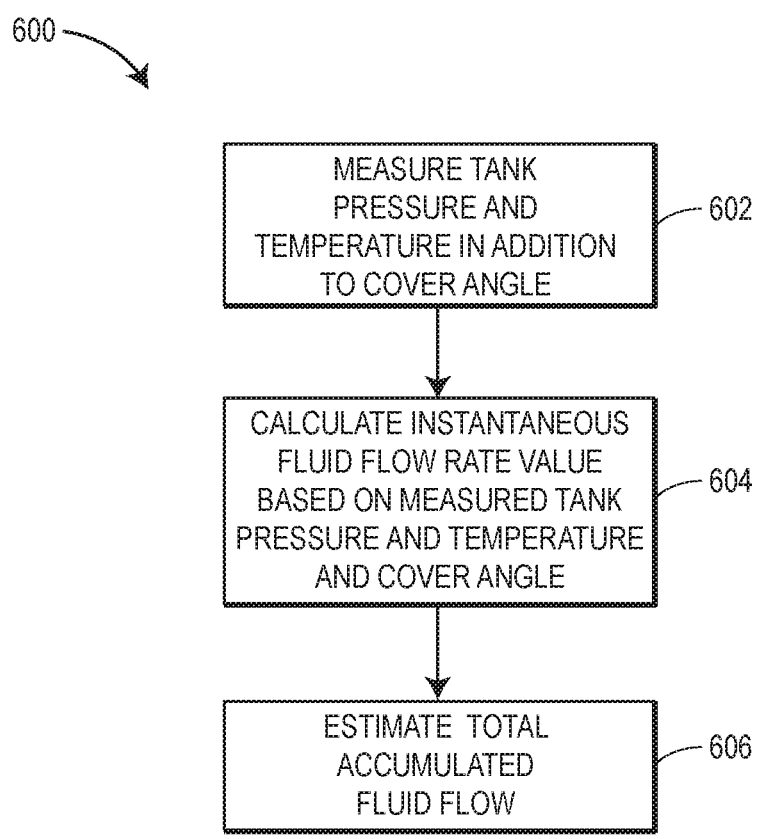
FIG. 10B is another exemplary flow chart depicting another method of one or more of the monitoring systems of the present disclosure.

Where
$P_T$=Absolute pressure of gas in tank
$T_T$=Absolute temperature of gas in tank
G=specific gravity of gas in tank
$P_{atm}$=Atmospheric pressure
Y=pressure pallet distance traveled
$K_1$=Absolute temperature constant
$K_2$=Pressure pallet travel constant
$K_3$=Trim shape constant Referring now to FIGS. 10A-10B, flow charts of example methods 500 and 600 of monitoring a diagnostic system of a process control system 14 are depicted. The methods 500 and 600 may be implemented, in whole or part, on one or more of the devices or systems such as those depicted in the monitoring system 10 of FIG. 1, the monitoring system 100 of FIGS. 2 and 3, the monitoring system 200 of FIGS. 4 and 5, and the monitoring system 300 of FIGS. 6 and 7, as explained more below. The methods 500 and 600 may be saved as a set of instructions, routines, programs, or modules on memory, such as a memory 18 of one of the previously defined motion detectors 17 or the base station memory 26 of FIG. 1, and may be executed by a processor, such as the processor 19 of one of the motion detectors 17 or the base processor 28 of FIG. 1.

The method 500 begins when a tilt sensor 136 is coupled to one or more of the cover 124, 224, 324, latch 126 or arm 226 of one of the relief valves 120, 220 or the relief vent 320, as described above. After being coupled to the relevant portion of the relief valves 120, 220 or the relief vent 320, the tilt sensors 136 are zeroed (Block 502) at installation. In the example of FIGS. 6 and 7, as an alternative, the rotary motion sensor 340 may be coupled to the hinge mechanism 326 and zeroed after installation. After this step, the tilt sensors 136 monitor a position, such as an angle, of one or more of the latch 126, arm 226, or cover 124, 224, 324 relative to an axis, such as one of axis A, B, C and D, depending upon the diagnostic system 12 being monitored. More specifically, the tilt sensors 136 may monitor the angle of the latch 126 and the cover 124 of the relief valve 120 of FIG. 2 relative to axis A of the base 122, axis L of the latch 126 or axis C of the cover 124, for example. In addition, the tilt sensor 136 may monitor the angle of the arm 226 or the angle of the cover 224 relative to an axis B of the base 221 (FIG. 5) and may monitor the angle of the cover 324 relative to the axis D of the base 322 (FIGS. 6 and 7). In the example of FIGS. 6 and 7, the alternative rotary motion sensor 340 may monitor the angle of the cover relative to the axis D, for example.

In block 506, the tilt sensor 136 or the rotary motion sensor 340 (FIGS. 6-7) detects when the angle of one or more of the latch 126, the arm 226, or the cover 124, 224, 324 is greater than zero, such as greater than zero relative to a respective axis of orientation, including one of axis A, B, C or D, for example, explained above. If the angle is greater than zero, the interface 121 associated with the tilt sensor 136 or an interface associated with the rotary motion sensor 340 transmits a signal, such as an alarm signal, indicating one or more of the latch 126, the arm 226 or the cover 124, 224, 324 is open in Block 508. In one example, the signal is transmitted to the base station 22 (FIG. 1) via the wireless network 24, allowing an operator to remotely understand the state of the relief valve system 12 without having to physically inspect/evaluate. If the angle is less than zero, the interface 121 associated with the tilt sensor 136 or the interface associated with the rotary motion sensor 340 transmits a signal indicating one or more of the latch 126, the arm 226 or the cover 124, 224, 324 is closed (Block 510), and the tilt sensors 136 and/or rotary motion sensor 340 continue to monitor one or more of the latch 126, the arm 226 or the cover 124, 224, 324 (Block 504). In one example, this signal may also be transmitted to the base station 22 via the wireless network 24. In another example, transmitting the signal indicating the cover 124, 224, 324 is open may include transmitting an alarm signal one or more of only during a preset period of time or when one or more of the latch 126, the cover 124, 224, 324 or the arm 226 is disposed at an angle from an axis greater than zero for a preset period of time.

Referring now to FIG. 10B, the monitoring system 300 of FIG. 7 may alternatively include the additional method 600 depicted in FIG. 10B. The method 600 begins with measuring tank pressure by the tank pressure sensor 344 and tank temperature by the tank temperature sensor 342 in addition to the angle of the cover 324 relative to the axis D of the base 322, for example, of the relief vent 320 (Block 602). In one example, the measured tank temperature and pressure and angle of the cover 324 data is transmitted by the interface 121 associated with the tilt sensor 136 (or the interface associated with the rotary motion sensor) to the base station 22 (FIG. 1).

In block 604, a processor, such as the processor 28 of the base station 22, calculates an instantaneous fluid flow rate value F out of the tank based on the measured pressure, measured temperature, and angle of the cover data. More specifically, the fluid flow value F is calculated in accordance with the following formula:

$$Q = \sqrt{\frac{K_1}{G*T_t}} * K_2 * \theta * P_t * \sin K_3 \sqrt{\frac{P_t - P_{atm}}{P_t}}$$

where
$P_T$=Absolute pressure of gas in tank
$T_T$=Absolute temperature of gas in tank
G=specific gravity of gas in tank
$P_{atm}$=Atmospheric pressure
Θ=cover angle or cover position
$K_1$=Absolute temperature constant
$K_2$=cover angle constant
$K_3$=Trim shape constant In block 606, the method 600 further includes estimating a total fluid flow value F out of the tank during a period of time of an overpressure event, for example. More specifically, the instantaneous fluid flow rate value F is calculated at a first period of time, such as when the recorded overpressure event began. A second instantaneous fluid flow rate value may then be calculated at a second period of time, such as when the recorded overpressure event ended. From this data, an estimated total fluid flow F value out of the tank from the first period of time until the second period of time may be calculated.

Figure 11A:
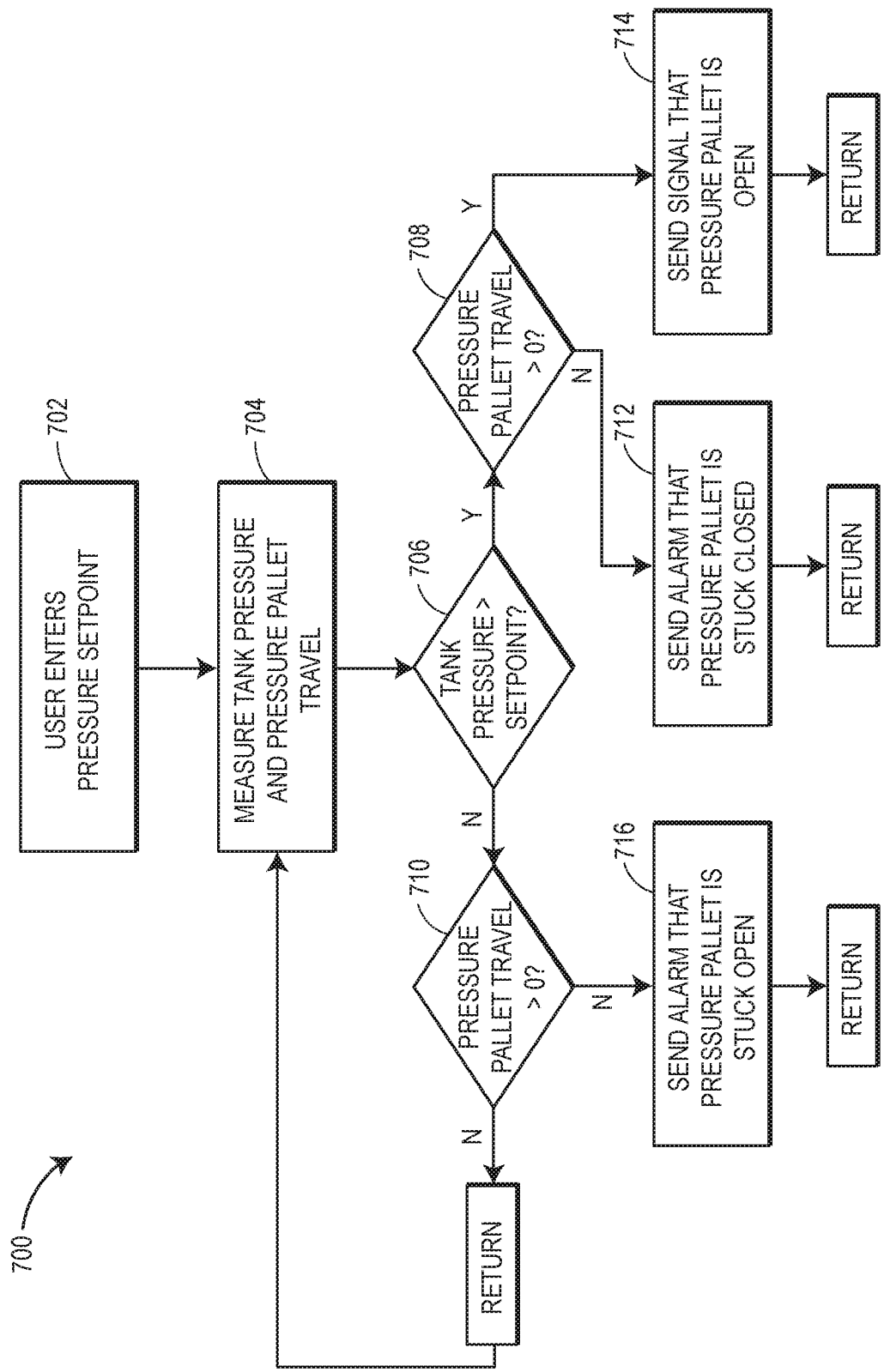
FIG. 11A is an exemplary flow chart depicting another method of the present disclosure.
Figure 11B:
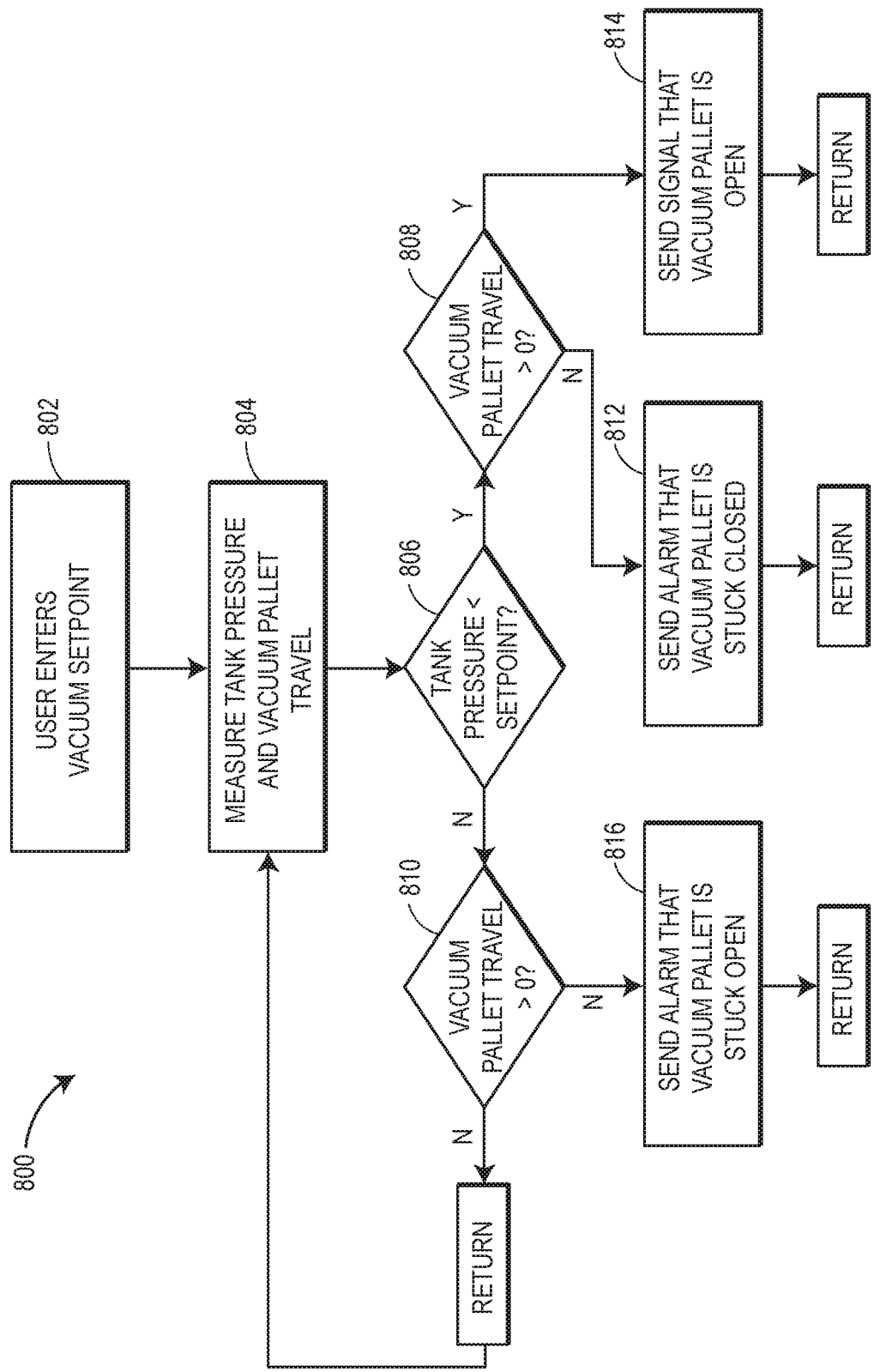
FIG. 11B is an exemplary flow chart depicting another method of the present disclosure.

Referring now to FIGS. 11A-11B, flow charts of example methods 700 and 800 of monitoring a relief valve are depicted. The methods 700 and 800 may be implemented, in whole or part, on one or more of the devices or systems such as those depicted in the monitoring system 10 of FIG. 1 and the monitoring system 400 of FIGS. 8 and 9, as explained more below. The method may be saved as a set of instructions, routines, programs, or modules on memory such as base station memory 26 of FIG. 1, and may be executed by a processor, such as the base processor 28 of FIG. 1.

Referring now to FIG. 11A, and in one example, the method 700 may begin with a user or an operator entering a pressure setpoint value for the pressure of the tank of the pressure vacuum relief valve 420 (FIGS. 8 and 9) in Block 702. Next, the method 700 may include measuring the pressure of the tank 459 of the pressure vacuum relief valve 420 via the pressure sensor 460 (FIG. 8) in Block 704. In another example, the method may further include measuring the temperature of the tank 459 via the temperature sensor 458. In addition, the method 700 includes measuring via the travel sensor 450 disposed on the pressure pallet 436 a distance traveled by the pressure pallet 436, also in Block 704. In one example, the method 700 may further including transmitting via one or more interfaces associated with the travel sensor, a signal indicating the distance traveled by the pressure pallet 436, for example, for a period of time, to the base station 22 or the remote computing device. The base station 22 or other remote device may save the distance traveled data to the memory 26 of the base station 22 or other computing device for use later in calculating an estimated fluid flow value F during an overpressure event, as described above.

In Block 706, using this data, the method 700 further includes determining, via one or more processors, such as the processor 28 of the base station 22, whether the measured tank pressure is greater than or less than and equal to the setpoint pressure. In either scenario, the method 700 then includes detecting whether the pressure pallet travel is greater than zero (Blocks 708 and 710). When the measured tank pressure is greater than the setpoint pressure, and the pressure pallet travel is not greater than zero, a signal, such as an alarm signal, indicating the pressure pallet is stuck closed, e.g., failing to open, is sent (Block 712). Alternatively, when the measured tank pressure is greater than the setpoint pressure and the pressure pallet travel measured is greater than zero, a signal, such as another alarm signal, indicating the pressure pallet is open is sent (Block 714).

When the measured tank pressure is determined to be not greater than the setpoint pressure in Block 706, and it is determined the pressure pallet travel is greater than zero in Block 710, a signal, such as another alarm signal, indicating the pressure pallet is stuck open, e.g., failing to close, is sent in Block 716. Alternatively, when the measured tank pressure is determined to be not greater than the setpoint pressure in Block 706, and it is determined the pressure pallet travel is not greater than zero in Block 710, the method 700 returns to measuring the tank pressure and the pressure pallet travel in Block 704.

In one example, an interface associated with the travel sensor 450, for example, or any other interface sends the signal indicating this state of the pressure vacuum relief valve 420, such as the signal indicating the pressure pallet is open in Block 714, the signal indicating the pressure pallet is stuck closed in Block 712 and/or the signal indicating the pressure pallet is stuck open in Block 716. In another example, the interface sends any of the aforementioned signals of the method 700 to the base station 22 that is communicatively coupled to the monitoring system 400, for example, to remotely notify an operator. This allows the operator of the monitoring system 400 for the pressure vacuum relief valve 420 of FIGS. 8 and 9 to understand the state of the pressure vacuum relief valve 420 without having to physically inspect the pressure vacuum relief valve 420.

Referring now to FIG. 11B, and in another example, the method 800 may begin with a user or an operator entering a pressure setpoint value for a vacuum pressure of the tank of the pressure vacuum relief value 420 in Block 802. Next, the method 800 may include measuring the pressure of the tank 459 of the pressure vacuum relief valve 420 via the pressure sensor 460 (FIG. 8) in Block 804. In another example, the method may further include measuring the temperature of the tank 458 via the temperature sensor 458. In addition, the method 800 includes measuring via the travel sensor 458 (FIG. 8) disposed on the vacuum pallet 442 a distance traveled by the vacuum pallet 442, also in Block 804. In block 806, the method 800 further includes determining, via one or more processors, whether the measured tank pressure is less than the setpoint pressure or not less than (e.g., equal to or greater than) the setpoint pressure. In either scenario, the method 800 then includes determining whether the vacuum pallet travel is greater than zero (Blocks 808 and 810). When the measured tank pressure is less than the setpoint pressure, and the vacuum pallet travel is not greater than zero, a signal, such as an alarm signal, indicating the vacuum pallet is stuck closed, e.g., failing to open, is sent (Block 812). Alternatively, when the measured tank pressure is less than the setpoint pressure, and the vacuum pallet travel measured is greater than zero, a signal, such as another alarm signal, indicating the vacuum pallet is open is sent (Block 814). When the measured tank pressure is determined to be not less than the setpoint pressure in Block 806, and it is determined the vacuum pallet travel is greater than zero in Block 810, a signal, such as another alarm signal, indicating the vacuum pallet is stuck open, e.g., failing to close, is sent in Block 816. Alternatively, when the measured tank pressure is determined to be not less than the setpoint pressure in Block 806, and it is determined the vacuum pallet travel is not greater than zero in Block 810, the method 800 returns to measuring the tank pressure and the vacuum pallet travel in Block 804.

In one example, an interface associated with the travel sensor 458, for example, or any other interface sends the signal indicating this state of the pressure vacuum relief valve 420, such as the signal indicating the vacuum pallet is open in Block 814, the signal indicating the vacuum pallet is stuck closed in Block 812 and/or the signal indicating the vacuum pallet is stuck open in Block 816. In another example, the interface sends any of the aforementioned signals of the method 800 to the base station 22 that is communicatively coupled to the monitoring system 400, for example, to remotely notify an operator. This allows the operator of the monitoring system 400 for the pressure vacuum relief valve 420 of FIGS. 8 and 9 to understand the state of the pressure vacuum relief valve 420 without having to physically inspect the pressure vacuum relief valve 420.

Figure 11C:
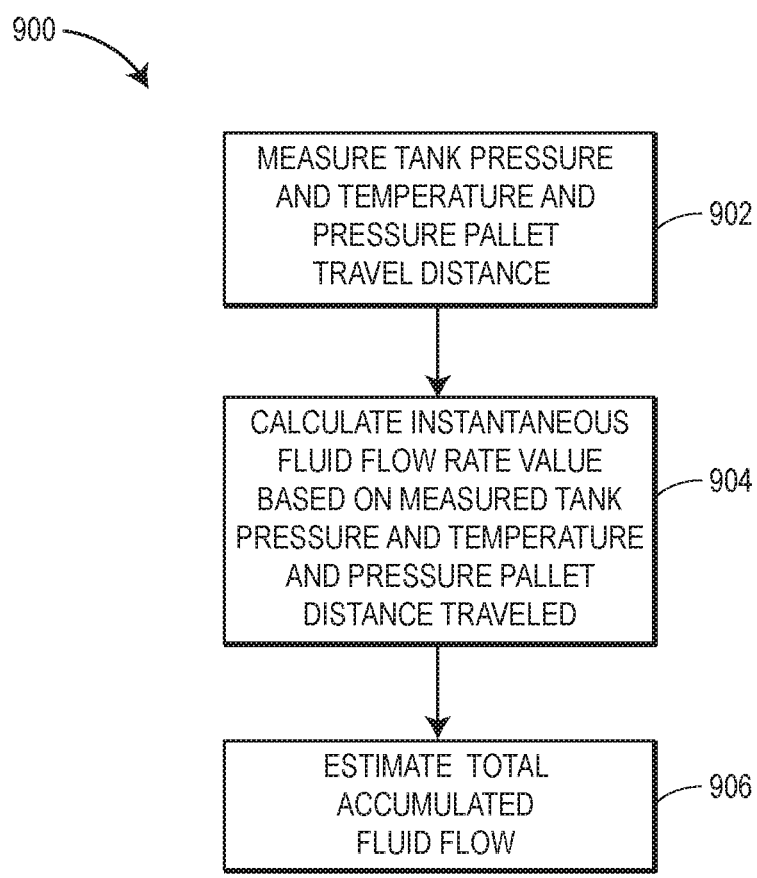
FIG. 11C is an exemplary flow chart depicting another method of the present disclosure.

Referring now to FIG. 11C, another flow chart of an example method 900 of the monitoring the pressure vacuum relief valve 420 of FIGS. 8 and 9 is depicted. Said another way, the monitoring system 400 of the pressure vacuum relief valve 420 of FIGS. 8 and 9 may additionally operate according to the method 900 depicted in FIG. 11C. The method 900 begins in Block 902 with measuring tank pressure by the tank pressure sensor 460, measuring tank temperature by the tank temperature sensor 442, and measuring a distance traveled by one or more of the pressure pallet 436 or the vacuum pallet 442, as described in FIGS. 11A and 11B relative to methods 700 and 800, respectively). In one example, the measured tank temperature and pressure and distance traveled by the pressure pallet 436 and/or the vacuum pallet 442 is transmitted by the interface associated with the travel sensor 450, 452 or the wireless accelerometer 454, 458 to the base station 22 (FIG. 1).

In Block 904, a processor, such as the processor 28 of the base station 22 or any other processor associated with the pressure vacuum relief valve 420, calculates an instantaneous fluid flow rate value F out of the tank, for example, based on the measured pressure, measured temperature, and distance traveled by the pressure pallet 436. More specifically, the fluid flow value F is calculated, via one or more processors, in accordance with the following formula:

$$Q = \sqrt{\frac{K_1}{G * T_t}} * K_2 * y * P_t * \sin K_3 \sqrt{\frac{P_t - P_{atm}}{P_t}}$$

Where
$P_T$=Absolute pressure of gas in tank
$T_T$=Absolute temperature of gas in tank
G=specific gravity of gas in tank
$P_{atm}$=Atmospheric pressure
Y=pressure pallet distance traveled
$K_1$=Absolute temperature constant
$K_2$=Pressure pallet travel constant
$K_3$=Trim shape constant In block 906, which is similar to block 606 of the method 600 in FIG. 10B, the method 900 further includes estimating a total accumulated fluid flow value F out of the tank during a period of time of an overpressure event, for example. More specifically, the instantaneous fluid flow rate value may be calculated (block 904) at a first period of time, such as when the recorded overpressure event began. A second instantaneous fluid flow rate value may then be calculated (block 904) at a second period of time, such as when the recorded overpressure event ended. From this data, an estimated total fluid flow F value out of the tank from the first period of time until the second period of time may be calculated. In this manner, the method 900 incorporates both the state of pressure vacuum relief valve 420, e.g., diagnostics relative to whether the pressure vacuum relief valve 420 is open or closed, and the tank pressure and temperature of the pressure vacuum relief valve 420. Said another way, the method 900 in conjunction with one or more of methods 700 and 800 in FIGS. 11A and 11B, respectively, allow an operator to monitor if the pressure vacuum relief valve 420 is both working properly, e.g., monitor tank temperature and pressure, and opening at the desired pressure because the methods 700, 800, and 900 allow simultaneous monitoring of both tank pressure and temperature and if the pressure vacuum relief valve 420 is opening.

Figure 12:
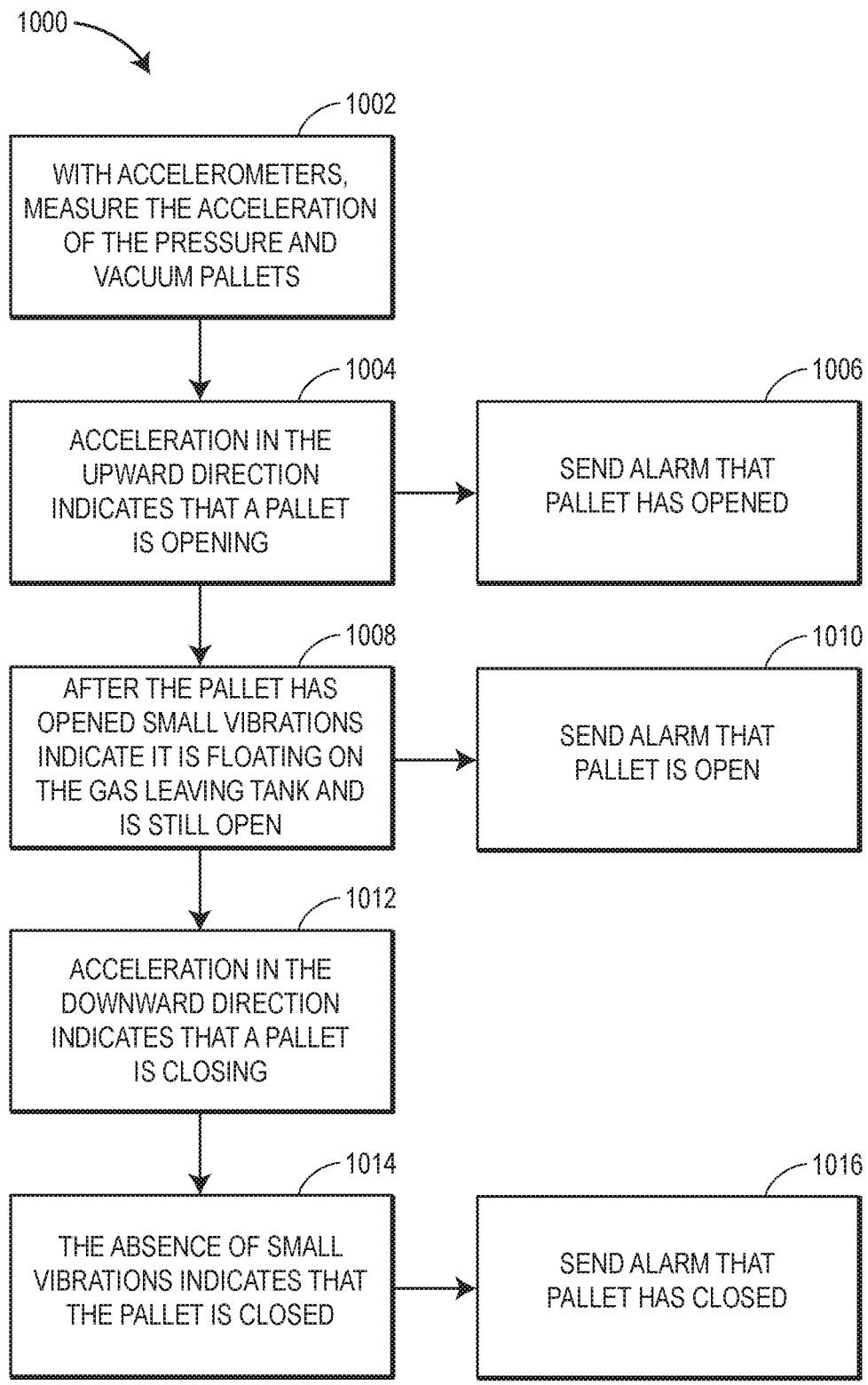
FIG. 12 is an exemplary flow chart depicting yet another method of the present disclosure.

Referring now to FIG. 12, a flow chart of another example method 1000 of monitoring a relief valve is depicted. The method 1000 may be implemented, in whole or part, on one or more of the devices or systems such as those depicted in the monitoring system 10 of FIG. 1 and the monitoring system 400 of the pressure vacuum relief valve 420 of FIG. 9, as explained more below. The method may be saved as a set of instructions, routines, programs, or modules on memory such as base station memory 6 of FIG. 1, and may be executed by a processor, such as the base processor 28 of FIG. 1.

In block 1002, the method 1000 begins with measuring an acceleration of the pressure pallet 436 with the first wireless accelerometer 454 and measuring an acceleration of the vacuum pallet 442 with the second wireless accelerometer 456 (FIG. 9). In block 1004, the method 1000 further includes detecting acceleration in a first direction, such as an upward direction or a direction toward an open position, of one or more of the pressure pallet 436 by the first wireless accelerometer 454 or the vacuum pallet 442 with the second wireless accelerometer 456.

Upon detecting acceleration of one or more of the pressure pallet 436 or the vacuum pallet 442 in block 1004, an alarm signal is transmitted in block 1006. The alarm signal indicates one or both of the pressure pallet 436 or the vacuum pallet 442 has opened, e.g., moves away from the respective valve seats 434, 440 of the pressure pallet 436 and the vacuum pallet 442, respectively (FIG. 9).

In block 1008, after one or more of the pressure pallet 436 or the vacuum pallet 442 has opened, small vibrations are detected by one or more of the first wireless accelerometer 454 or the second wireless accelerometer 456. The small vibrations indicate the pressure pallet 436 or the vacuum pallet 442 is floating on fluid, such as gas, leaving the tank portion of the body 458 of the pressure vacuum relief valve 420, and that the pressure pallet 436 and/or the vacuum pallet 442 is still in an open position.

Upon detecting this condition in block 1008, another alarm signal is transmitted in block 1010. This alarm signal indicates one or both of the pressure pallet 436 or the vacuum pallet 442 is still open or in an open position, e.g., moved away from the respective valve seats 434, 400 of the pressure pallet 436 and the vacuum pallet 442, respectively (FIG. 9).

In block 1012, the method 1000 may further include detecting acceleration in a second direction, such as a downward direction or a direction toward the valve seat 434, 440, of the pressure pallet 436 and/or the vacuum pallet 442 indicating that one or more of the pressure pallet 436 and/or the vacuum pallet 442 is moving back to a closed position. Said another way, the pressure pallet 436 and/or the vacuum pallet 442 is closing and making sealing contact with the valve 434, 440 corresponding to the pressure pallet 436 and the vacuum pallet 442.

In block 1014, after one or more of the pressure pallet 436 or the vacuum pallet 442 has closed, the method includes detecting an absence of any small vibrations by one or more of the first wireless accelerometer 454 or the second wireless accelerometer 456. The absence of such small vibrations being detected indicates the pressure pallet 436 or the vacuum pallet 442 is not floating on fluid, such as gas, leaving the tank portion of the body 458 of the pressure vacuum relief valve 420, and that the pressure pallet 436 and/or the vacuum pallet 442 is closed.

Upon detecting one or more of the pressure pallet 436 and/or the vacuum pallet 442 is closed in block 1014, another alarm signal is transmitted, such as by an interface associated with one or more of the first wireless accelerometer 454 or the second wireless accelerometer 456. This alarm signal indicates one or more of the pressure pallet 436 and/or the vacuum pallet 442 is closed. In one example, the alarm signal indicating one or more of the pressure pallet 436 and/or the vacuum pallet 442 is closed in block 1016 may be transmitted via the network 24 (FIG. 1) to the remotely located base station 22 (FIG. 1) and stored in the memory 26 of the base station 22, for example, to record and track diagnostic data relating to the operation and performance of the pressure vacuum relief valve 420.

In view of the foregoing, it will be appreciated that the various systems 10, 100, 200, 300, 400 and methods 500-1000 of the present disclosure offer several advantages. Operators of various relief valve systems are able to constantly monitor their systems to instantaneously and remotely know the state of the diagnostic systems to avoid and/or minimize fines relating to any VOCs being emitted to the atmosphere. In addition, systems 10, 100, 200, 300 and 400 and corresponding methods 500-1000 include wireless monitoring that is not intrusive and does not require the measurement of pressure or flow. Because data about one or more of the state of the relief valve, pressure and temperature of the tank, and/or motion and position of various parts of the relief valve may be sent through the wireless network to a monitoring hub, such as the remote base station 22 (FIG. 1), operators are able to remotely monitor their various relief valve systems and react quickly to any alarms indicating gas is leaving the tank, for example, without having to physically examine the relief valve system.

Said another way, by wirelessly measuring orientation and/or acceleration instead of pressure and flow to understand a current state of the relief valve, the relief valve systems may be monitored without being intrusive to the relief valve system. Such intrusions to the system could add an additional leak path to the system and/or affect performance. Moreover, by enabling the information about the state of the relief valve system to be wirelessly transmitted, users may remotely access and obtain the data about the state of the relief valve system.

Although certain relief valves and relief vents have been described herein in accordance with the teachings of the present disclosure, the scope of coverage of this patent is not limited thereto. On the contrary, while the invention has been shown and described in connection with various preferred embodiments, it is apparent that certain changes and modifications, in addition to those mentioned above, may be made. This patent covers all embodiments of the teachings of the disclosure that fairly fall within the scope of permissible equivalents. Accordingly, it is the intention to protect all variations and modifications that may occur to one of ordinary skill in the art.

In addition, while certain fluid flow equations described above may be used to calculate a fluid flow rate, for example, various other fluid flow equations may alternatively be used and still fall within the scope of the present disclosure. For example, regression could be used to create a polynomial equation that relates the dependent variable (flow) to the independent variables (tank pressure, temperature, and pallet travel/cover angle). Still other methods understood by persons having ordinary skill in the art may one or more of alternatively and/or additionally be used and still fall within the scope of the present disclosure.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one implementation," "one embodiment," "an implementation," or "an embodiment" means that a particular element, feature, structure, or characteristic described in connection with the implementation is included in at least one implementation. The appearances of the phrase "in one implementation" or "in one embodiment" in various places in the specification are not necessarily all referring to the same implementation.

Some implementations may be described using the expression "coupled" along with its derivatives. For example, some implementations may be described using the term "coupled" to indicate that two or more elements are in direct physical or electrical contact. The term "coupled," however, may also mean that two or more elements are not in direct contact with each other, but yet still co-operate or interact with each other. The implementations are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the implementations herein. This is done merely for convenience and to give a general sense of the invention. This description should be read to include one or at least one and the singular also includes the plural unless it is obvious that it is meant otherwise.

Moreover, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A monitoring system for a relief valve, the relief valve having a body and a cover that is configured to be fixed in a first position relative to the body by a latch, the monitoring system comprising:
   a first tilt sensor adapted to be coupled to the latch and configured to detect an orientation of the latch; and
   a second tilt sensor adapted to be coupled to the cover and configured to detect an orientation of the cover;
   wherein, upon indication by the first tilt sensor that the orientation of the latch exceeds a first threshold, the monitoring system is configured to generate a signal indicating that the latch is unlocked; and
   wherein, upon indication by the second tilt sensor that the orientation of the cover exceeds a second threshold, the monitoring system is configured to generate a signal indicating that the cover is open.

2. The monitoring system of claim 1, further comprising a base station including a base processor and a base memory, the base station communicatively coupled to one or more of the first tilt senor and the second tilt sensor via a wireless network.

3. A monitoring system for a lockdown hatch, the lockdown hatch having a body and a cover that is configured to be fixed in a first position relative to the body by an arm, the monitoring system comprising:
   a first tilt sensor adapted to be coupled to the arm;
   a second tilt sensor adapted to be coupled to the cover;
   wherein, upon an indication by the first tilt sensor that an angle of the arm exceeds a first threshold, the monitoring system is configured to generate a signal indicating that the cover is open, and
   wherein, upon an indication by the second tilt sensor that an angle of the cover exceeds a second threshold, the monitoring system is configured to generate a signal indicating that the cover is open.

4. The monitoring system of claim 3, further comprising a base station including a base processor and a base memory, the base station communicatively coupled to one or more of the first tilt sensor or the second tilt sensor via a wireless network and adapted to receive the signal.

5. A monitoring system for a relief valve, the relief valve including a body, a cover coupled to the body, and a control assembly that defines a first relief opening and a second relief opening, the monitoring system comprising:
   a first wireless accelerometer adapted to be coupled to a first portion of the control assembly near the first relief opening configured to detect acceleration of the first portion;
   a second wireless accelerometer adapted to be coupled to a second portion of the control assembly near the second relief opening and configured to detect acceleration of the second portion; and
   wherein, upon detection by the first wireless accelerometer of acceleration of the first portion of the control assembly in a first direction, the monitoring system is configured to generate a signal indicating that the first relief opening is in an open position, and, upon detection by the second wireless accelerometer of acceleration of the second portion of the control assembly in a second direction, the monitoring system is configured to generate a signal indicating that the second relief opening is in an open position.

6. The monitoring system of claim 5, wherein each of the first wireless accelerometer and the second wireless accelerometer are communicatively coupled to a base station via a wireless network, the base station comprising a base processor and a base memory and for receiving the signals associated with the monitoring system.

7. The monitoring system of claim 5, wherein each of the first and second wireless accelerometers detect oscillatory motion of one or both of the first portion and the second portion of the control assembly, the detection of oscillatory motion indicating the first relief opening is in the open position.

8. The monitoring system of claim 5, wherein one or more of the first wireless accelerometer detects movement in a second direction of the first portion of the control assembly without movement in a first direction opposite the second direction, indicating the first relief opening is in the open position, and the second wireless accelerometer detects movement in the first direction of the second portion of the control assembly without movement in the second direction opposite the first direction, indicating the second relief opening is in the open position.

9. A monitoring system for a relief vent, the relief vent comprising a base adapted to be coupled to a tank and a cover rotatably coupled to the base by a hinge mechanism, the monitoring system comprising:
    an orientation sensor that is configured to detect an orientation of the cover relative to an axis;
    a pressure sensor that is configured to measure a pressure of a fluid within the tank; and
    a temperature sensor that is configured to measure a temperature of a fluid within the tank;
    wherein the monitoring system is configured to determine whether the cover is open and estimate a fluid flow out of the relief vent based on signals from the orientation sensor, pressure sensor, and temperature sensor.

10. The monitoring system of claim 9, where, upon detection by the orientation sensor the orientation of the cover fails to exceed a threshold, the the monitoring system is configured to transmit a signal indicating the cover is closed.

11. The monitoring system of claim 9, wherein the orientation sensor is communicatively coupled to a base station via a wireless network, the base station including a base processor and a base memory, and adapted to receive the signal.

12. The monitoring system of claim 9, wherein the orientation sensor is a tilt sensor coupled to the cover, the tilt sensor detecting the angle of the cover is greater than a threshold relative to an axis of the base.

13. The monitoring system of claim 9, wherein the orientation sensor is a rotary motion sensor, and the rotary motion sensor is coupled to the hinge mechanism, the rotary motion sensor detecting the angle of the cover is greater than a threshold-relative to an axis of the base.

14. The monitoring system of claim 9, further comprising one or more of a wireless accelerometer or a gyroscope coupled to a portion of the cover and for sensing one or more of motion and position of the cover.

15. A monitoring system for a pressure vacuum relief valve that is coupled to a tank, the pressure vacuum relief valve including a body defining a pressure chamber and a vacuum chamber, the pressure chamber having a pressure valve seat and a pressure pallet adapted to sealingly engage the pressure valve seat, and the vacuum chamber having a vacuum valve seat and a vacuum pallet adapted to sealingly engage the vacuum valve seat of the vacuum chamber, the monitoring system comprising:
    a first sensor that is adapted to be coupled to the pressure pallet and configured to measure a movement of the pressure pallet;
    a second sensor that is adapted to be coupled to the vacuum pallet and configured to measure a movement of the vacuum pallet;
    a pressure sensor that is adapted to be coupled to the pressure vacuum relief valve and configured to measure a pressure of fluid in the tank;
    wherein, when the pressure sensor indicates that the pressure of fluid in the tank is above a vacuum relief set point and the second sensor indicates movement of the vacuum pallet away from the vacuum valve seat, the monitoring system is configured to generate a signal indicating that the vacuum pallet is stuck in an open position;
    wherein, when the pressure sensor indicates that the pressure of fluid in the tank is below the vacuum relief set point and the second sensor does not indicate movement of the vacuum pallet away from the vacuum valve seat, the monitoring system is configured to generate a signal indicating that the vacuum pallet is stuck in a closed position;
    wherein, when the pressure sensor indicates that the pressure of fluid in the tank is below a pressure relief set point and the first sensor indicates movement of the pressure pallet away from the pressure valve seat, the monitoring system is configured to generate a signal indicating that the pressure pallet is stuck in an open position; and
    wherein, when the pressure sensor indicates that the pressure of fluid in the tank is above the pressure relief set point and the first sensor does not indicate movement of the pressure pallet away from the pressure valve seat, the monitoring system is configured to generate a signal indicating that the pressure pallet is stuck in a closed position.

16. The monitoring system of claim 15, further comprising a base station having a base processor and a base memory, the base station communicatively coupled via a wireless network to one of the first sensor or and one of the second sensor, the base station for receiving signals.

17. The monitoring system of claim 15, further comprising a temperature sensor coupled to the tank for measuring the temperature of the tank and a pressure sensor coupled to the tank for measuring the pressure of the tank, each of the temperature sensor and the pressure sensor configured to transmit a signal indicating one of the measured temperature or the measured pressure.

18. The monitoring system of claim 17, where each of the measured temperature, the measured pressure, and the detected movement by one or more of the pressure pallet and the vacuum pallet is used to estimate an instantaneous fluid flow value F out of the pressure vacuum relief valve during an overpressure event.

19. The monitoring system of claim 18, further comprising a processor, the processor estimating the instantaneous fluid flow value F by calculating the fluid flow in accordance with:

$$Q = \sqrt{\frac{K_1}{G*T_t}} * K_2 * y * P_t * \sin K_3 \sqrt{\frac{P_t - P_{atm}}{P_t}}$$

Where
Q=Instantaneous flow rate
$P_T$=Absolute pressure of gas in tank
$T_T$=Absolute temperature of gas in tank
G=specific gravity of gas in tank
$P_{atm}$=Atmospheric pressure
Y=pressure pallet distance traveled
$K_1$=Absolute temperature constant
$K_2$=Pressure pallet travel constant $K_3$=Trim shape constant.

20. A method of monitoring a diagnostic system of a process control system, the method comprising:
coupling a first tilt sensor to a latch, the first tilt sensor configured to detect an orientation of the latch;
coupling a second tilt sensor to a cover, the second tilt sensor configured to detect an orientation of the cover;
monitoring a position of the latch relative to an axis of the first tilt sensor;
monitoring a position of the cover relative to an axis of the second tilt sensor;
indicating, via the first tilt sensor, that the orientation of the latch exceeds a first threshold and generating a signal indicating the latch is unlocked via the monitoring system; and
indicating, via the second tilt sensor, that the orientation of the cover exceeds a second threshold and generating a signal indicating the cover is open via the monitoring system.

21. The method of claim 20, wherein indicating, via the one of the first tilt sensor or the second tilt sensor, one or more of the latch, the cover, or the arm exceeds a first threshold or a second threshold, respectively, comprises and generating a signal that the cover is not securely closed.

22. The method of claim 20, wherein coupling the first tilt sensor to the latch further comprises zeroing the first tilt sensor.

23. The method of claim 20, wherein coupling the second tilt sensor to, the cover further comprises zeroing the second tilt sensor.

24. The method of claim 20, wherein indicating, via the second tilt sensor, that the orientation of the cover exceeds a second threshold and generating a signal indicating the cover is open via the monitoring system comprises generating an alarm signal one or more of only during a preset period of time or when the latch is disposed at an angle from an axis greater than zero for a preset period of time.

25. The method of claim 20, wherein indicating, via the second tilt sensor, that the orientation of the cover exceeds a second threshold and generating a signal indicating the cover is open via the monitoring system comprises sending an alarm signal to a base station indicating the cover is one or more of open or not securely closed.

26. A method of monitoring a relief valve of a process control system, the method comprising:
coupling a first wireless accelerometer to a first portion of a control assembly near a first relief opening of the relief valve;
coupling a second wireless accelerometer to a second portion of the control assembly near to a second relief opening of the relief valve;
detecting, via the first wireless accelerometer, acceleration of the first portion of the control assembly;
detecting, via the second wireless accelerometer, acceleration of the second portion of the control assembly;
upon detecting acceleration of the first portion of the control assembly in a first direction, generating, via a monitoring system, a signal indicating the first relief opening is in an open position; and
upon detecting acceleration of the second portion of the control assembly in a second direction generating, via a monitoring system, a signal indicating the second relief opening is in the open position.

27. The method of claim 26, further comprising detecting, via one or more of the first and second wireless accelerometers, one or more of an opening speed or a closing speed of one or more of the first relief opening or the second relief opening.

28. The method of claim 26, further comprising detecting, via one or more of the first and second wireless accelerometers, oscillatory movement of one or more of the first portion of the control assembly or the second portion of the control assembly, the oscillatory movement indicating one or more of the first relief opening or the second relief opening is in the open position.

29. A method of monitoring a relief vent of a process control system, the method comprising:
providing an orientation sensor configured to detect an orientation of a cover relative to an axis;
providing a pressure sensor configured to measure a pressure of a fluid within a tank;
providing a temperature sensor configured to measure a temperature of a fluid within the tank; and
determining, via the monitoring system, whether the cover is open and estimating a fluid flow out of the relief vent based on signals from the orientation sensor, pressure sensor, and temperature sensor.

30. The method of claim 29, further comprising zeroing of the orientation sensor after being coupled to a relief vent.

31. The method of claim 29, wherein providing a temperature sensor configured to measure a temperature of a fluid within the tank comprises coupling the temperature sensor to the tank coupled to the relief vent, the method further comprising measuring a temperature of the tank via the temperature sensor versus time, and measuring the pressure of the tank via the pressure sensor versus time.

32. The method of claim 31, further comprising calculating, via one or more processors, a fluid flow rate value F out of the tank according to measured tank pressure, tank temperature, and cover position data, the fluid flow value F calculated in accordance with:

$$Q = \sqrt{\frac{K_1}{G*T_t}} * K_2 * \theta * P_t * \sin K_3 \sqrt{\frac{P_t - P_{atm}}{P_t}}$$

where
$P_T$=Absolute pressure of gas in tank
$T_T$=Absolute temperature of gas in tank
G=specific gravity of gas in tank
$P_{atm}$=Atmospheric pressure
Θ=angle of cover
$K_1$=Absolute temperature constant
$K_2$=cover angle constant
$K_3$=Trim shape constant.

33. The method of claim 32, wherein estimating a fluid flow out of the relief vent based on signals from the orientation sensor, pressure sensor, and temperature sensor comprises estimating a total fluid flow value F out of the tank during a period of time of an overpressure event.

34. A method of monitoring a relief valve comprising:
coupling a first sensor to a pressure pallet of the relief valve and a second sensor to a vacuum pallet of the relief valve;
measuring movement of the pressure pallet via the first sensor or movement of the vacuum pallet via the second sensor;
coupling a pressure sensor to the relief valve, the pressure sensor configured to measure a pressure of fluid in a tank;
generating, via a monitoring system, a signal indicating the vacuum pallet is stuck in an open position when the pressure sensor indicates that the pressure of fluid in the tank is above a vacuum relief set point and the second sensor indicates movement of the vacuum pallet away from the vacuum valve seat;
generating, via the monitoring system, a signal indicating the vacuum pallet is stuck in a closed position when the pressure sensor indicates that the pressure of fluid in the tank is below the vacuum relief set point and the second sensor does not indicate movement of the vacuum pallet away from the vacuum valve seat;
generating, via the monitoring system, a signal indicating that the pressure pallet is stuck in an open position when the pressure sensor indicates that the pressure of fluid in the tank is below a pressure relief set point and the first sensor indicates movement of the pressure pallet away from the pressure valve seat; and
generating, via the monitoring system, a signal indicating that the pressure pallet is stuck in a closed position when the pressure sensor indicates that the pressure of fluid in the tank is above the pressure relief set point and the first sensor does not indicate movement of the pressure pallet away from the pressure valve seat.

35. The method of claim 34, further comprising measuring a pressure of the tank associated with the relief valve via the pressure sensor, measuring a temperature of the tank via the temperature sensor, and estimating, via one or more processors, a fluid flow value F out of the tank during an overpressure event based on the temperature of the tank measured, the pressure of the tank measured, and movement by the pressure pallet.

36. The method of claim 35, wherein estimating a fluid flow value F out of the tank during an overpressure event based on the temperature of the tank measured, the pressure of the tank measured, and movement by the pressure valve pallet comprises calculating, via one or more processors, the fluid flow value F in accordance with:

$$Q = \sqrt{\frac{K_1}{G*T_t}} * K_2 * y * P_t * \sin K_3 \sqrt{\frac{P_t - P_{atm}}{P_t}}$$

Where
Q=Instantaneous flow rate
$P_T$=Absolute pressure of gas in tank
$T_T$=Absolute temperature of gas in tank
G=specific gravity of gas in tank
$P_{atm}$=Atmospheric pressure
Y=pressure pallet distance traveled
$K_1$=Absolute temperature constant
$K_2$=Pressure pallet travel constant $K_3$=Trim shape constant.

37. The method of claim 34, further comprising detecting, via one of the first sensor, the pressure pallet is stuck open when the movement by the pressure pallet is greater than zero and the pressure of the tank measured is less than or equal to the tank pressure setpoint value, and sending an alarm signal via an interface associated with the first sensor that the pressure pallet is failing to close.

38. The method of claim 34, wherein detecting, via the second sensor, the vacuum pallet is failing to close when movement by the vacuum pallet is greater than zero and the pressure of the tank measured is greater than the tank pressure setpoint value, and sending an alarm signal via an interface associated with the second sensor that the vacuum pallet is failing to close.

39. The method of claim 34, further comprising detecting, via a wireless accelerometer, one or more of the pressure pallet or the vacuum pallet is failing to close when detecting motion of one or more of the pressure pallet and the vacuum pallet in a first direction without subsequent motion in a second direction opposite the first direction, and sending via the monitoring system, a signal indicating one or more of the pressure pallet or the vacuum pallet is open.

40. The method of claim 34, further comprising detecting, via one or more of the first sensor or the second sensor, a speed of one or more of the pressure pallet or the vacuum pallet.

41. The method of claim 34, further comprising detecting, via one or more of the first sensor or the second sensor, movement of the pressure pallet in a direction indicating the pressure pallet is closing and an absence of small vibrations of pressure pallet, indicating the pressure pallet is closed, and sending, via the monitoring system, a signal indicating the pressure pallet is closed.

42. The method of claim 34, further comprising detecting, via one or more of the first sensor or the second sensor, movement of the vacuum pallet in a direction indicating the vacuum pallet is closing and an absence of small vibrations of vacuum pallet, indicating the vacuum pallet is closed, and sending, via the monitoring system, a signal indicating the vacuum pallet is closed.

43. The monitoring system of claim 15, wherein one or more of the first sensor and the second sensor is a travel sensor.

44. The monitoring system of claim 15, wherein one or more of the first sensor or the second sensor is an accelerometer.

* * * * *

UNITED STATES PATENT AND TRADEMARK OFFICE
CERTIFICATE OF CORRECTION

PATENT NO.        : 10,983,025 B2
APPLICATION NO.   : 16/027058
DATED             : April 20, 2021
INVENTOR(S)       : Tony A. Durant et al.

It is certified that error appears in the above-identified patent and that said Letters Patent is hereby corrected as shown below:

In the Specification

At Column 12, Line 43, "including" should be -- include --.

In the Claims

At Column 19, Line 43, "the the" should be -- the --.

At Column 20, Line 48, "or and" should be -- and --.

At Column 21, Line 45, "to," should be -- to --.

Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*